United States Patent
Traub et al.

(10) Patent No.: US 12,093,376 B2
(45) Date of Patent: Sep. 17, 2024

(54) APPARATUSES AND METHODS FOR DETECTING MANIPULATION ON A BUS SYSTEM OF A VEHICLE

(71) Applicant: ZF Friedrichshafen AG, Friedrichshafen (DE)

(72) Inventors: Stefan Traub, Friedrichshafen (DE); Mauro Cesar Zanella, Friedrichshafen (DE); Joao Curti, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 507 days.

(21) Appl. No.: 17/290,782

(22) PCT Filed: Oct. 7, 2019

(86) PCT No.: PCT/EP2019/077037
§ 371 (c)(1),
(2) Date: Jun. 21, 2021

(87) PCT Pub. No.: WO2020/094312
PCT Pub. Date: May 14, 2020

(65) Prior Publication Data
US 2022/0004629 A1 Jan. 6, 2022

(30) Foreign Application Priority Data
Nov. 6, 2018 (DE) .................. 10 2018 218 902.1

(51) Int. Cl.
*G06F 21/55* (2013.01)
*G06F 13/36* (2006.01)
*G06N 3/08* (2023.01)

(52) U.S. Cl.
CPC ............ *G06F 21/554* (2013.01); *G06F 13/36* (2013.01); *G06N 3/08* (2013.01); *G06F 2221/034* (2013.01)

(58) Field of Classification Search
CPC .......... G06F 21/554; G06F 13/36; G06N 3/08
(Continued)

(56) References Cited

U.S. PATENT DOCUMENTS

| | | | |
|---|---|---|---|
| 8,935,040 B2 | 1/2015 | Julson et al. | |
| 2008/0043629 A1* | 2/2008 | Hofman | H04L 43/50 370/242 |

(Continued)

FOREIGN PATENT DOCUMENTS

| | | |
|---|---|---|
| DE | 102013216942 A1 | 2/2014 |
| EP | 3291119 A1 | 3/2018 |

OTHER PUBLICATIONS

Marcel Kneib, et al., "Scission: Signal Characteristic-Based Sender Identification and Intrusion Detection in Automotive Networks", Computer and Communications Security, Oct. 15-19, 2018, pp. 787-800, session 5A: Cyberphysical, ACM, Toronto, Canada, XP058421163.

(Continued)

*Primary Examiner* — Kambiz Zand
*Assistant Examiner* — Phuc Pham
(74) *Attorney, Agent, or Firm* — LEYDIG, VOIT & MAYER, LTD.

(57) ABSTRACT

A safety device for detecting manipulations on a bus system of a vehicle includes a receiver configured to connect to the bus system of the vehicle and to receive a signal from the bus system, an analyzer configured to analyze a transition between signal states of the signal, and an evaluator configured to evaluate the signal as a manipulated signal or an unmanipulated signal based on analysis performed by the analyzer.

13 Claims, 3 Drawing Sheets

(58) Field of Classification Search
USPC .......................................................... 726/23
See application file for complete search history.

(56) References Cited

U.S. PATENT DOCUMENTS

2016/0188876 A1* 6/2016 Harris .................... G06N 20/00
726/23
2018/0181743 A1* 6/2018 Hofman .................. H04L 12/40

OTHER PUBLICATIONS

Matthew Spicer, et al.,, "Intrusion Detection System for Electronic Communication Buses: A New Approach", https://pdfs.semanticscholar.org/791e/4326d8bb5a35fd9125582c72f2649b8858c9.pdf, Dec. 11, 2017, pp. 1-91, Semantic Scholar, Seattle, USA, XP055652618.

* cited by examiner

APPARATUSES AND METHODS FOR DETECTING MANIPULATION ON A BUS SYSTEM OF A VEHICLE

CROSS REFERENCE TO RELATED APPLICATIONS

This application is a U.S. National Phase application under 35 U.S.C. § 371 of International Application No. PCT/EP2019/077037, filed on Oct. 7, 2019, and claims benefit to German Patent Application No. DE 10 2018 218 902.1, filed on Nov. 6, 2018. The International Application was published in German on May 14, 2020 as WO 2020/094312 A1 under PCT Article 21(2).

FIELD

The present disclosure relates to a safety device for detecting manipulations, in particular for detecting manipulated signals, on a bus system, such as a CAN bus, of a vehicle.

BACKGROUND

Bus systems are increasingly used in modern vehicles for safety-critical messages and their transmission, such as controlling the wheels, functionalities of driver assistance systems, locking and unlocking the vehicle, or activating and deactivating an alarm system.

The bus systems therefore increasingly represent a safety risk. For example, attacks on the vehicle may be carried out in the form of the man-in-the-middle attacks in which replicated messages are transmitted on the bus in order to control functions of the vehicle, for example to unlock the doors of the vehicle. For this purpose, messages could, for example, be introduced externally via the pressure measuring system of the tires.

In order to prevent such attacks, for example, the use of encryption has been proposed which would, however, greatly reduce the length of the useful data fields of the individual packets.

For detecting attacks, US 2016/0188876 A1 also proposes the analysis of the message density on the CAN bus.

However, such a method is only conditionally applicable to the detection of asynchronous messages and their replication.

EP 3291119 A1, in turn, proposes a system which prevents manipulated software from being run on a control unit (ECU, electronic control unit).

SUMMARY

In an embodiment, the present disclosure provides a safety device for detecting manipulations on a bus system of a vehicle. The safety device includes a receiver configured to connect to the bus system of the vehicle and to receive a signal from the bus system, an analyzer configured to analyze a transition between signal states of the signal, and an evaluator configured to evaluate the signal as a manipulated signal or unmanipulated signal based on analysis performed by the analyzer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
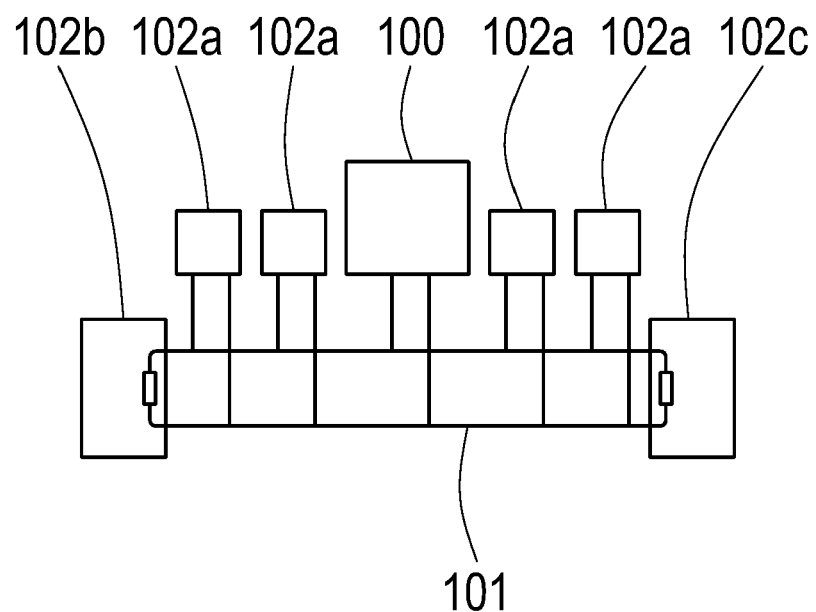
FIG. 1 shows a bus system with control units and the safety device.

The present disclosure provides a solution which makes it possible to detect manipulated signals on a bus system of a vehicle.

A safety device for detecting manipulation, or for detecting manipulated signals, on a bus system of a vehicle comprises in this case a receiving unit, an analysis unit, and an evaluation unit.

The safety device in this case can be designed in particular in the form of a control unit, such as an electronic control unit (ECU) with additional safety functionalities (safety ECU).

The receiving unit of the safety device is designed in this case for connecting to the bus system of the vehicle and for receiving a signal from the bus system.

The safety device, like the other control units (ECUs) of the vehicle, is therefore connected to the bus system (vehicle bus), such as the controller area network (CAN) bus, of the vehicle. The safety device therefore receives the messages which are exchanged between the control units and possibly other devices connected to the bus. In other words, the safety device monitors the signals or packets transmitted on the bus and taps them from the bus.

The signals received by the receiving unit are then passed on to the analysis unit. The analysis unit is designed to analyze the transition between the signal states of the signal.

In other words, the analysis unit analyzes the transition between signal states or between logic levels of a signal. The analysis unit therefore analyzes the characteristics of the edge or the signal curve between logic levels, i.e., it analyzes the characteristics of rising or falling edges, in particular between the high and low signal states of a digital signal.

The result of this analysis is output to the evaluation unit. The evaluation unit is configured to evaluate the signal as a manipulated signal or unmanipulated signal based on the analysis by the analysis unit.

Accordingly, the evaluation unit evaluates the signal as a manipulated signal, i.e., a signal originating from a man-in-the middle attack, for example, or an authentic, unmanipulated signal based on the analysis of the transition between the signal states or the logic levels of a digital signal.

Since the characteristics, or the signal curve, of a transition between the logic levels depend on various factors, the signal of a control unit cannot be fully replicated in these characteristics of the transition between signal states, which allows detection of a manipulated signal.

In particular, the characteristics of the transition between the signal states (or signal levels) depend on physical characteristics, such as the output impedances or the position of the transmitting unit on the bus. In addition, the edges change as soon as an additional device is connected to the vehicle bus since, for example, the impedances and resistances in the vehicle bus change. It is therefore possible to detect manipulated signals by using the transitions between the signal levels.

For this purpose, the evaluation unit can, for example, perform a comparison of a parameter of the transition of the signal with a tolerance range for this parameter.

That is to say, a comparison of the analysis result with a reference value and a surrounding tolerance range for the particular parameter can be performed.

Such parameters can in particular be the signal curve between the signal states themselves, the edge steepness, the transition duration between the signal levels, the rise time or the fall time, as well as overshooting or undershooting during the transition between the signal levels.

A tolerance range, i.e., a reference value (or reference curve) and a surrounding acceptable range can be defined for each of these parameters, and this characteristic, or this parameter, of the measured signal can be compared with this tolerance range.

That is to say, for example, a time specification of a transition duration can be stored along with a specific signal curve of the transition between the signal states.

In order to allow the signal to be analyzed, it can first be converted by means of an analog-to-digital converter into a digital signal which is output to the analysis unit. For example, a field-programmable gate array (FPGA) board can be used for this purpose, which enables high sampling on the bus. Such analog-to-digital converters are capable of sampling at sampling rates of 500 MS/s. For example, since the CAN bus operates at a maximum of 1 Mb/s, a high number of sample values can be obtained for determining the signal characteristic. Such analog-to-digital converters, such as the ADS 5474, also allow sampling at a resolution of 16 bits, which allows an accurate analysis of the signal curve.

In this case, the FPGA can also be used to implement the additional functions of the other units.

Instead of an FPGA, other elements may also be used for the implementation, such as digital signal processors, DSP, or application-specific integrated circuits, ASIC.

Since, as described above, the transition or the edges also depend, for example, on the position of the transmitting control unit in the CAN, it can be provided to also perform the evaluation of the signal as a manipulated signal or unmanipulated signal based on the source of the signal and a tolerance range defined depending on the source (for a particular parameter).

That is to say, tolerance ranges can be provided for each transmitting control unit (for each source) and the particular parameters since the edges of the signals can be designed differently depending on the transmitting control unit.

It can consequently be provided that the evaluation unit determines the (assumed) data source using the signal content.

The transitions may also change due to environmental influences or other external factors, which may also be included.

Accordingly, the signal can be evaluated as a manipulated signal or an unmanipulated signal based on environmental influences and a tolerance range (for the particular parameter) defined depending on the environmental influences.

Furthermore, provision can be made for the evaluation unit to be provided with a neural network for evaluating the signal as a manipulated signal or unmanipulated signal.

Since, as described above, the parameters of the signal transition or the characteristics of the edges depend on many factors, it may be difficult to define general tolerance ranges for the particular parameters or for the signal curve itself. With the aid of a neural network, the system can be trained for the unmanipulated signals.

In this case, it can for example be provided that the neural network is trained based on signals received by the receiving unit after the installation of the safety device in a vehicle. That is to say, by using the messages, which are defined as unmanipulated messages, then transmitted on the bus, the neural network can learn the tolerance ranges of the particular parameters or the tolerance range for the signal curve itself for the particular transmitting control units and possibly also for the particular environmental influences.

That is to say, the safety device learns the acceptable limits for unmanipulated signals, or their parameters or signal curves, for the particular vehicle with the particular components connected there by training after the installation of the safety device into the vehicle.

This enables a further improvement in the detection of the manipulated signals since the tolerance ranges do not have to be chosen to be wide enough so that they can be used for any vehicles, or for all vehicles of a vehicle type.

Accordingly, it can be provided to train the neural network with a plurality of training data records for different environmental influences and/or different signals of different control units, or to provide such a trained neural network in the safety device.

In order to prevent the manipulated signals from driving functions of the vehicle, an execution prevention unit may furthermore be provided.

This execution prevention unit may be designed to prevent the control intended by the signal from being executed when the evaluation unit evaluates the signal as a manipulated signal. In other words, the execution prevention unit may be designed such that the function that the signal is to initiate is not performed.

For this purpose, it can be provided, for example, that the execution prevention unit deactivates at least one control unit (or also several or all control units) of the vehicle so that further manipulation of these control units is not possible. This can be carried out, for example, by sending a corresponding signal to the particular other control units.

An associated vehicle comprises the above-mentioned bus system and the above-mentioned safety device. In this case, the safety device is connected to the bus system. Further control units (ECUs) or also vehicle control units (VCUs) or domain ECUs can furthermore be connected to the bus system.

An associated method for detecting manipulation on a bus system of a vehicle includes, in a corresponding manner, the steps of receiving a signal from the bus system of a vehicle, analyzing the transition between signal states of the signal, and evaluating the signal as a manipulated signal or unmanipulated signal based on the result of the analysis step.

FIG. 1 shows a bus system of a vehicle (vehicle bus), such as a CAN bus, with the associated control units and the safety device. The control units 102*a* and other devices, such as the domain ECU 102*b* or the vehicle control unit, VCU, 102*c*, are each connected to the bus 101.

The safety device 100 is connected to the bus 101 in a manner corresponding to the other control units 102. The safety device 100 can therefore monitor or tap the signals transmitted to the bus 101 and subject them to the analysis for manipulated signals.

Figure 2:
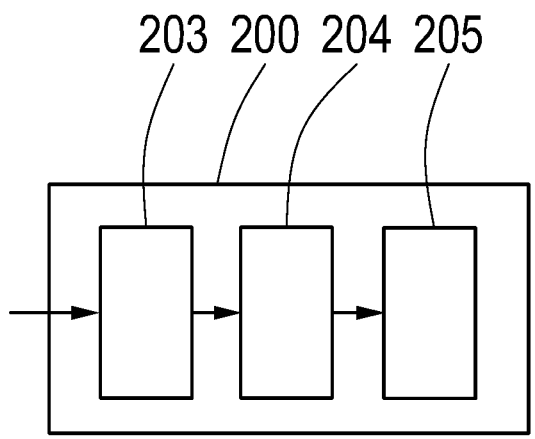
FIG. 2 shows a safety device and its components.

A structure of such a safety device is shown in FIG. 2. The safety device 200 comprises the receiving unit 203 which receives the data from the bus system or the vehicle bus (represented by the arrow on the left side of the unit 203). The receiving unit then outputs the signal to the analysis unit 204 which analyzes the transition between the signal states of the signal. The analysis result is then output to the evaluation unit 205 which performs the evaluation of the signal as a manipulated signal or unmanipulated signal based on the analysis by the analysis unit 204.

The characteristics of a transition between signal states or signal levels, such as high and low, of a digital signal are now described with reference to FIGS. 3 and 4 below.

Figure 3:
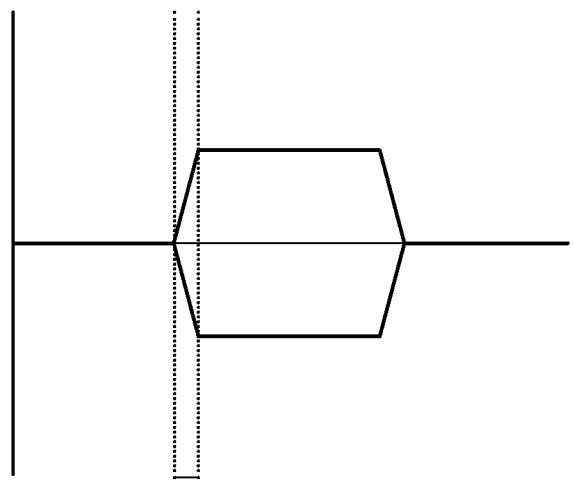
FIG. 3 shows signal curves with rising and falling edges.

FIG. 3 shows a signal transition to a low signal level, i.e., low, and a signal transition to a high signal level, i.e., high, of a digital signal in the dashed range. This signal transition, i.e., the signal curve of a rising or falling edge, is used to analyze manipulated signals.

Figure 4:
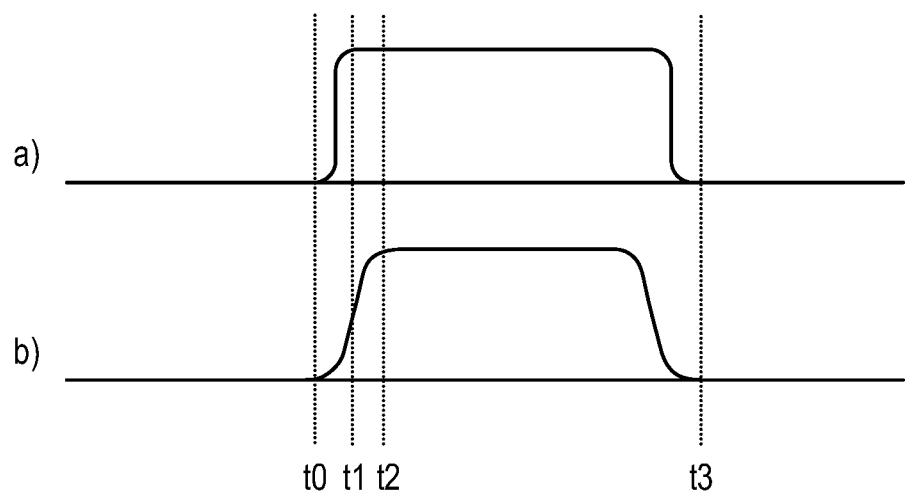
FIG. 4 shows different signal curves of rising and falling edges.

A simplified representation of a rising edge is shown in FIG. 4.

As can be seen from FIG. 4, the transition duration, i.e., the rise time, in the case of FIG. 4*a* is significantly lower than in the case of FIG. 4*b*. As can be seen, the signal is at the high level already at time t1 in the case of FIG. 4*a* but is at the high level only at time t2 in the case of FIG. 4*b*.

If a control unit is further away from the measuring safety device, it must be assumed that the edge has a longer rise time or a longer transition duration than when the control unit is situated very close to the safety device. As already described, the edge can also change by connecting further or other devices to the bus. If it is therefore known that, due to the distance of the control unit from the safety device and due to the other characteristics at the bus, a signal from a control unit usually has the edge known in FIG. 4*b*, i.e., has, for example, the transition duration t2-t0 as a parameter, a received signal in the form of the signal shown in FIG. 4*a* with a shorter transition duration t1-t0 can therefore be identified as a manipulated signal.

Figure 5:
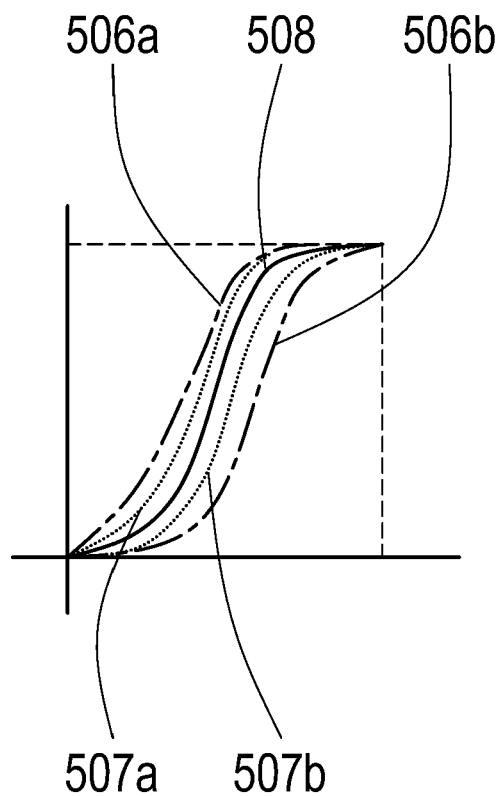
FIG. 5 shows a signal curve with associated tolerance ranges.

In FIG. 5, a signal curve of an unmanipulated signal of a control unit 508 and a tolerance range in the form of dashed lines 507*a* and 507*b* are shown. If, during the analysis, a signal curve of a transition results which falls within this tolerance range between lines 507*a* and 507*b*, this signal is classified or evaluated as an authentic or unmanipulated signal. If, however, a signal which is outside of the tolerance range, such as signal 506*a* or 506*b*, is received, for example, the evaluation unit detects the signal as a manipulated signal on the basis of the analysis and classifies/evaluates it accordingly.

The tolerance range shown between lines 507*a* and 507*b* may, as described above, be defined using training for each transmitting control unit (i.e., each source).

Figure 6:
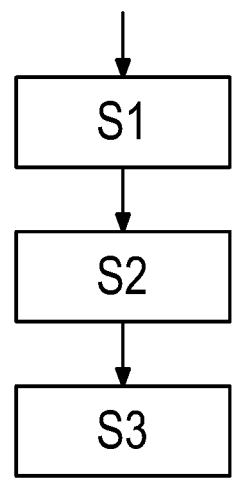
FIG. 6 shows a flowchart of an associated method.

FIG. 6 shows the method steps of the associated method for detecting manipulations on a bus system of a vehicle.

First, in step S1, a signal is received from the bus system of a vehicle.

In step S2, the transition between signal states of the signal is then analyzed.

Subsequently in step S3, the signal is evaluated as a manipulated signal or unmanipulated signal based on the result of the analysis step.

The above-defined units may also be designed in the form of software. The receiving unit, the analysis unit, and the evaluation unit can also be designed to be together, for example, in one unit, such as an FPGA. There is no need for a structural separation between the units in this case. However, the units can of course also be designed in the form of separate elements.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100, 200 Safety device
102*a* Control units
102*b* Domain ECU
102*c* Vehicle control unit, VCU
203 Receiving unit
204 Analysis unit
205 Evaluation unit
506*a*, 506*b* Manipulated signal
507*a*, 507*b* Limits of the tolerance range
508 Unmanipulated signal

The invention claimed is:

1. A safety device for detecting manipulations on a bus system of a vehicle, the safety device comprising:
a receiver configured to connect to the bus system of the vehicle and to receive a signal from the bus system;
an analyzer configured to analyze a transition duration of the signal between an off state and an on state; and
an evaluator configured to evaluate the signal as a manipulated signal or an unmanipulated signal based on analysis of the transition duration performed by the analyzer and based on a distance between the receiver and an origin of the signal by comparing the transition duration to an unmanipulated signal transition duration corresponding to the distance between the receiver and the origin of the signal.

2. The safety device according to claim 1, wherein the evaluator is configured to perform a comparison of at least one parameter of the transition of the signal with a predefined tolerance range.

3. The safety device according to claim 1, further comprising:
an analog-to-digital converter configured to convert the signal into a digital signal and to output the digital signal to the analyzer.

4. The safety device according to claim 1, wherein the evaluator is configured to perform the evaluation of the signal as a manipulated signal or non-manipulated signal based on a source of the signal and a tolerance range defined depending on the source.

5. The safety device according to claim 1, wherein the evaluator is configured to perform the evaluation of the signal as a manipulated signal or unmanipulated signal based on environmental influences and a tolerance range defined depending on the environmental influences.

6. The safety device according to claim 1, wherein the evaluator comprises a neural network configured to evaluate the signal as a manipulated signal or an unmanipulated signal.

7. The safety device according to claim 6, wherein the neural network is trained for a vehicle based on signals received by the receiver after installation of the safety device in the vehicle.

8. The safety device according to claim 7, wherein the neural network is trained with a plurality of training data records for different environmental influences and/or different signals of different controllers.

9. The safety device according to claim 1, further comprising:
an execution prevention unit configured to prevent the control intended by the signal from being executed when the evaluator evaluates the signal as a manipulated signal.

10. The safety device according to claim 9, wherein the execution prevention unit deactivates at least one further controller of the vehicle to prevent the control intended by the signal from being executed.

11. A vehicle comprising:
a bus system;
safety device according to claim 1, wherein the safety device is connected to the bus system.

12. A method for detecting manipulations on a bus system of a vehicle, the method comprising:
determining an unmanipulated transition duration based on a distance between an external device connected to the bus system and a receiver, the unmanipulated transition duration corresponding to a transition duration of an unmanipulated signal from the external device to the receiver, and the transition duration corresponding to a time duration between an off state and an on state of the unmanipulated signal;
receiving, at the receiver, a signal from the bus system of the vehicle;
analyzing a transition duration of the signal between its off state and on state;
evaluating the signal as a manipulated signal or unmanipulated signal by comparing the analyzed transition duration of the signal with the determined unmanipulated transition duration.

13. The safety device of claim 1, wherein the origin of the signal is a controller, the controller being one of an electronic control unit (ECU) or a vehicle control unit (VCU).

\* \* \* \* \*